US00RE37498B1

(19) United States
(12) Reissued Patent
Thomas

(10) Patent Number: US RE37,498 E
(45) Date of Reissued Patent: Jan. 8, 2002

(54) AUTOMOTIVE HAIL PROTECTION AND SHADE CANOPY

(75) Inventor: James H. Thomas, Oklahoma City, OK (US)

(73) Assignee: Layne Christensen Company, Mission Woods, KS (US)

(21) Appl. No.: 09/233,654

(22) Filed: Jan. 19, 1999

Related U.S. Patent Documents

Reissue of:
(64) Patent No.: 5,597,005
Issued: Jan. 28, 1997
Appl. No.: 08/586,396
Filed: Jan. 16, 1996

(51) Int. Cl.[7] ..... E04H 15/00
(52) U.S. Cl. ..... 135/87; 52/83; 52/18; 135/90; 135/97; 135/908
(58) Field of Search ..... 52/3, 18, 22, 80.2, 52/83; 135/87, 90, 100, 907–909

(56) References Cited

U.S. PATENT DOCUMENTS 1,481,019 A 1/1924 Luebbert
1,808,693 A 6/1931 Terzoli
1,839,076 A 12/1931 Adams
2,239,399 A 4/1941 Pandya
2,355,008 A 8/1944 Moran
2,493,749 A 1/1950 Brown et al.
2,693,195 A 11/1954 Frieder et al.
3,807,421 A 4/1974 Geiger et al.
4,068,404 A 1/1978 Sheldon
4,320,603 A 3/1982 Kirschen
4,982,534 A 1/1991 Saitoh et al.
5,010,695 A 4/1991 Schildge, Jr. .....

*Primary Examiner*—Beth A. Stephan
(74) *Attorney, Agent, or Firm*—Shook, Hardy & Bacon LLP

(57) ABSTRACT

A drive under new automotive hail protection roof hip-and-valley cable-tension type canopy is formed by a rectangular grid pattern of rigid post assemblies joined at their upper ends by longitudinally, transversely and diagonally extending cables forming a coextensive fabric roof support.

15 Claims, 5 Drawing Sheets

AUTOMOTIVE HAIL PROTECTION AND SHADE CANOPY

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to shelters and more particularly to a new automobile hail protecting and shade structure.

Automotive dealers park their for-sale vehicles in an open air lot where the vehicles are exposed to weather. Inclement weather, such as a hailstorm, sometimes damages the vehicles by denting the roof, hood, and trunk areas. Repairs must be made before the vehicle is in acceptable condition by the average customer.

In areas where hailstorms frequently occur, hail protective insurance rates are relatively high. Thus, adding to the cost of business to an automotive dealer.

This invention provides a canopy shielding automotive vehicles from hailstorms, as well as providing a sunshade resulting in economic savings for both the vehicle dealer and customers.

DESCRIPTION OF THE PRIOR ART

The prior art generally discloses camouflage structures and plant shelters which for the most part utilize a plurality of earth anchored guy wires around the perimeter of the shelter for maintaining the structure upright. None of the prior art patents, it is believed, disclose a shelter which shields articles under the shelter from the impact of hailstones.

U.S. Pat. No. 2,355,008 issued Aug. 1, 1944 to Moran for CAMOUFLAGE STRUCTURE and U.S. Pat. No. 4,068,404 issued Jan. 17, 1978 to Sheldon for SHADE-PRODUCING STRUCTURE AND METHOD are believed good examples of the state-of-the-art.

This invention is believed distinctive over the prior art by providing a hip-and-valley roof or hip cable-tension type roof structure which protects equipment thereunder from hailstorms and snow in addition to providing shade.

SUMMARY OF THE INVENTION

A plurality of corner and intermediate anchor posts are disposed in a rectangular array defining the perimeter of the area to be protected. Similarly, a plurality of intermediate support posts are disposed in predetermined spaced relation between the several anchor posts.

A first plurality of horizontal framing cables secured to the top portion of the several anchor posts define roof ridges, eaves, and end limits of a structure. A second plurality of bracing cables extend diagonally from one cave anchor post to a diagonally opposite eave anchor post over the roof ridge cable. A third plurality of fabric cover support cables extend transversely across the bracing cable roof structure between opposite eaves in parallel equally spaced-apart relation.

A plurality of elongated rectangular lengths of fabric longitudinally secured together in juxtaposed cable reinforced relation at their junctures extend transversely across the roof structure and are secured at their respective ends to the respective eave framing cable. Other triangular sections of the fabric close gable ends of the structure.

The principal object of this invention is to provide a hip-and-valley cable-tension type roof structure for protecting automotive vehicles from inclement weather and additionally providing a sunshade.

DESCRIPTION OF THE PREFERRED EMBODIMENTS

Figure 1:
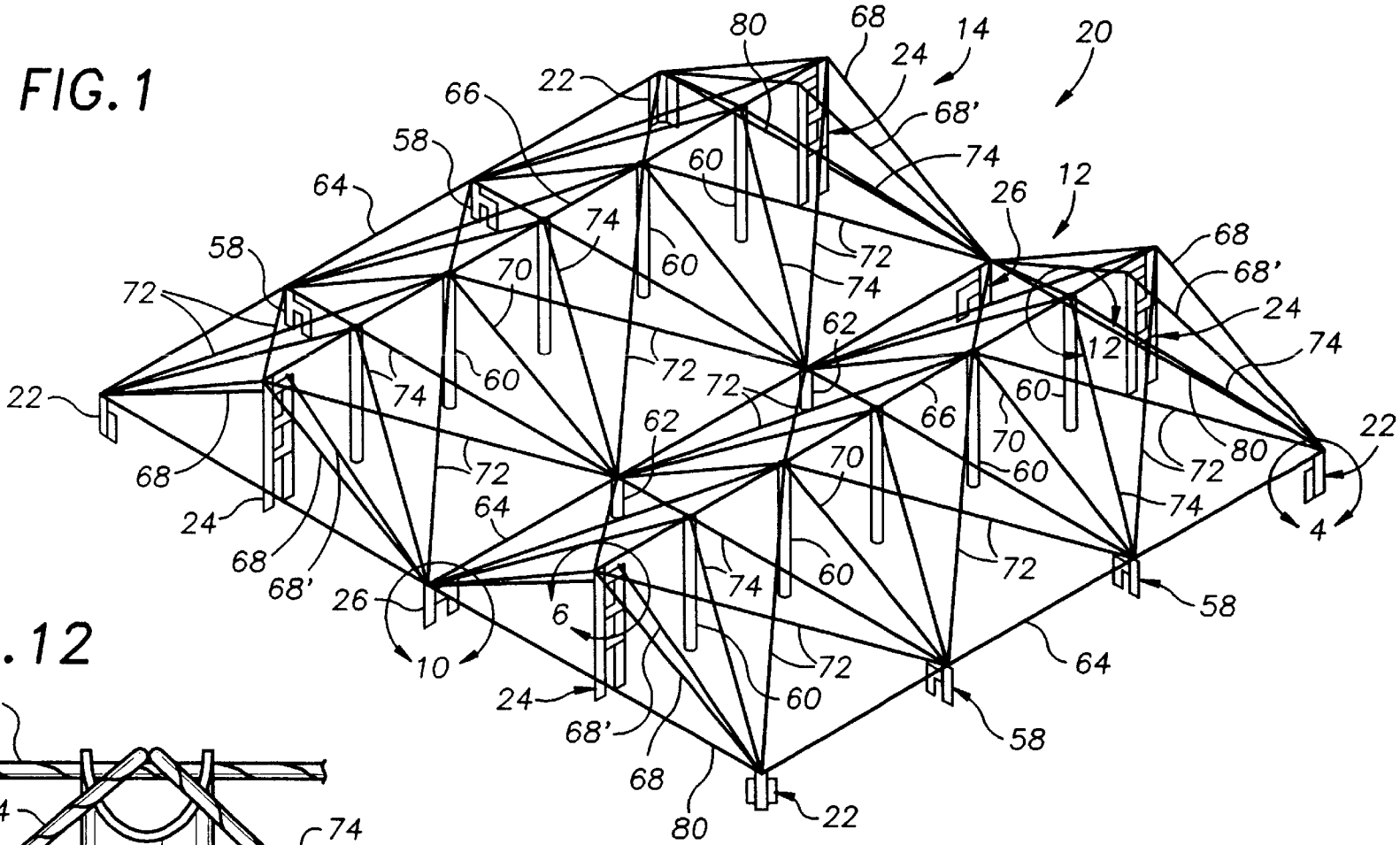
FIG. 1 is an isometric view of grid boundry line support posts and a network of frame bracing cables.

Like characters of reference designate like parts in those figures of the drawings in which they occur.

In the drawings:

The canopy 10 (FIG. 3) as a whole is formed by a pair of juxtaposed hip-and-valley roof structures 12 and 14 forming a valley 16 therebetween.

The canopy includes a post and cable-tension support structure 20 (FIG. 1) comprising a plurality (4) corner post assemblies 22 surrounding a rectangular area of predetermined size, for example, 150 feet (45 m) long by 200 feet (60 m) wide. A like plurality of ridge end posts 24 and a pair of valley end posts 26 are disposed in equal spaced relation transversely of the structrue at its respective ends.

Figure 4:
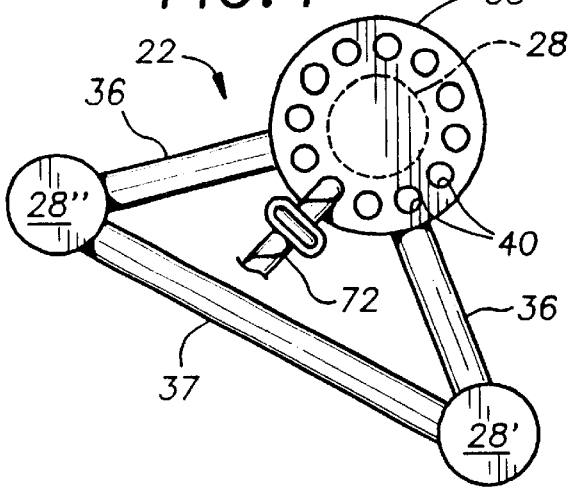
FIG. 4 is a top view of a corner post assembly enclosed by the arrows 4 of FIG. 1.
Figure 5:
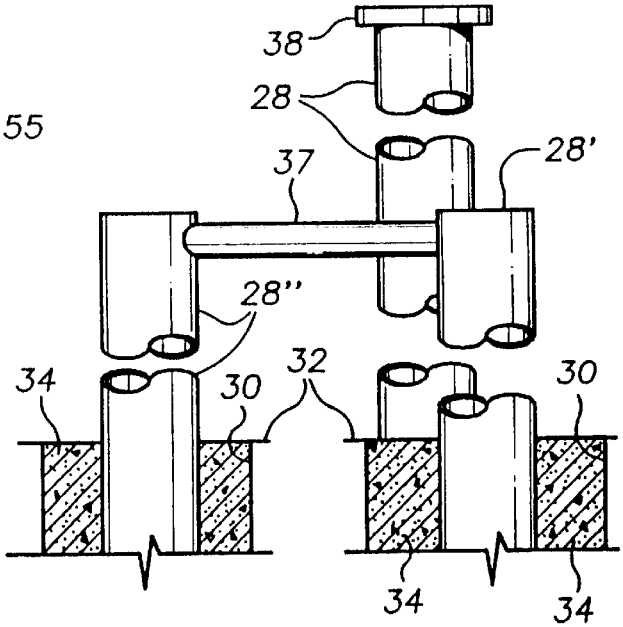
FIG. 5 is a fragmentary side elevational view, partly in section, of FIG. 4.

Referring also to FIGS. 4 and 5, each corner post assembly 22 comprises a plurality (3) posts arranged in right triangular fashion with the post 28 at the right angle position being the primary corner post with the secondary brace posts 28' and 28" disposed in spaced parallel relation with respect to the post 28 and inline with the structure eave and adjacent end limit, respectively.

The length of the corner posts is such that approximately 6 feet (1.82 m) of their depending end portions may be disposed in suitable post holes 30 of larger diameter than the posts and the annulus filled with concrete 34. The upper end portion of the primary post 28 projects above the surface of the earth 32 a selected distance, for example, 9 feet (2.74 m) for the purposes believed presently apparent.

The upper end portions of the corner posts 22 are rigidly interconnected by horizontal right triangular disposed side members 36 and a hypotenuse member 37. The brace posts 28' and 28" are capped and the upper end of the primary corner post 28 is closed by a plate 38 having a larger diameter than the diameter of the post 28. The marginal edge portion of the plate 38 outwardly of the perimeter of the post 28 is provided with a plurality of circumferentially equally spaced holes or apertures 40 for receiving cable end portions, as presently explained.

Referring also to FIGS. 6–9, the roof ridge end post assembly 24 comprises an elongated post 42 of selected diameter and length braced by a shorter companion brace post 43 with both posts similarly embedded in the earth in concrete as described hereinabove for the corner post assembly 22.

Figure 6:
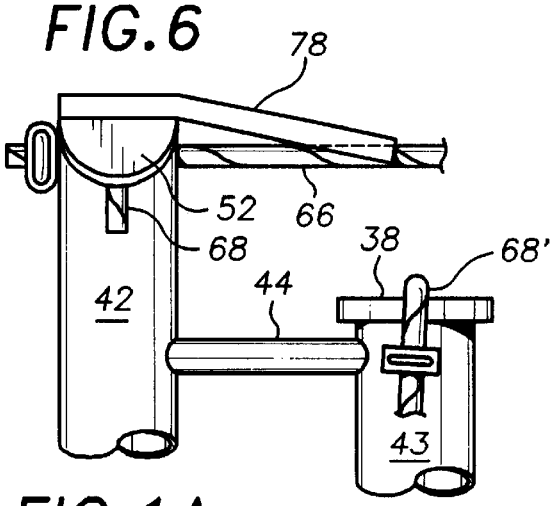
FIG. 6 is a fragmentary elevational view of a roof ridge end anchor post top portion enclosed by the arrows 6 of FIG. 1.
Figure 8:
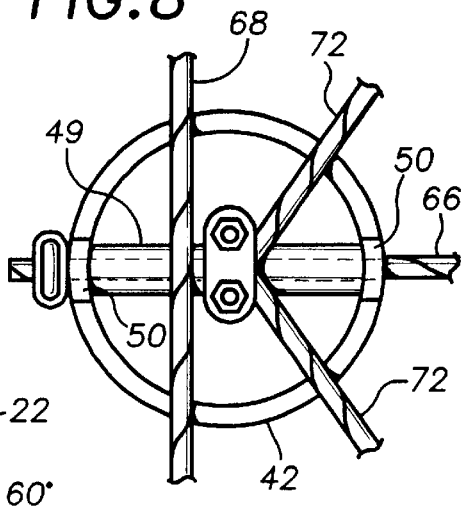
FIG. 8 is a top view of the post of FIG. 6 with the fabric cover protective shield removed.

Similarly, the primary ridge post 42 is joined to its brace post 43 by a plurality of horizontal brace members 44, only one being shown in FIG. 6. The top end portion of the ridge post 42 is diametrically cut away from the structure eave and valley sides to form an inverted V-shape as viewed in elevation (FIG. 9) with the apexes of the V-shapes aligned with the roof ridge line. The inverted V-shapes are line drilled adjacent the apex of the inverted V-shape, as at 48, for receiving a cable 66 as hereinafter described. A section of padding material 50 overlies the upper limit of the V-shape, as viewed in FIGS. 8 and 9, and an inverted V-shaped panel 52 overlies the V-shape for the purpose presently explained.

Figure 11:
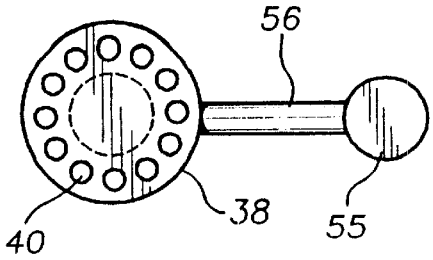
FIG. 11 is a top view of FIG. 10.
Figure 10:
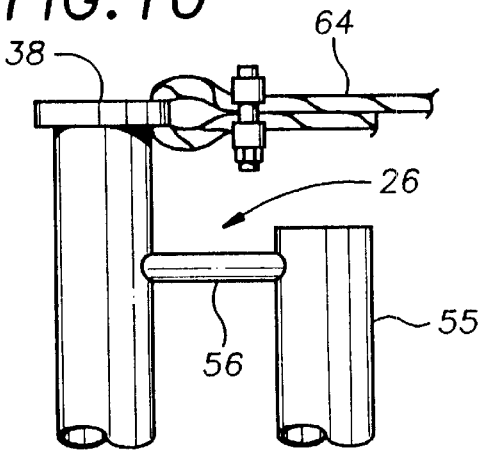
FIG. 10 is a fragmentary elevational view of a roof valley end post enclosed by the arrows 10 of FIG. 1.

Referring also to FIGS. 10 and 11, the roof valley end post assembly 26 comprises a primary post 54, of substantially equal length with respect to the corner post 28, secured to a companion post 55 by a brace 56. Both posts 54 and 55 being similarly buried in concrete in the surface of the earth.

The top of the post 55 is closed and one of the apertured plates 38 overlies the top of the primary valley end post 54 for anchoring cable end portions, as presently explained.

Intermediate eave post assemblies 58 identical with the valley end post assembly 26 are interposed in equally spaced relation between respective end posts 22 at opposite eaves of the structure 20. A plurality five (5), in the example shown, of ridge line posts 60 of substantial equal length with respect to the primary post 42 of the ridge end post assembly 24 are interposed in equally spaced relation between the end post assemblies 24 for completing the respective post ridge support for the cable support structure 20, as presently explained. The upper end of each of the posts 60 are similarly cut away to form an inverted V-shape (FIG. 9), and are similarly line drilled for receiving the roof ridge cable 66, as presently explained.

Similarly, a pair of intermediate valley posts 62 substantially equal in length with the principal corner post 28 are inserted and cemented in the earth in equal spaced relation between the valley end post assemblies 26. The valley intermediate posts 62 are similarly provided with a corner post cap 38 for anchoring cable end portions.

Figure 12:
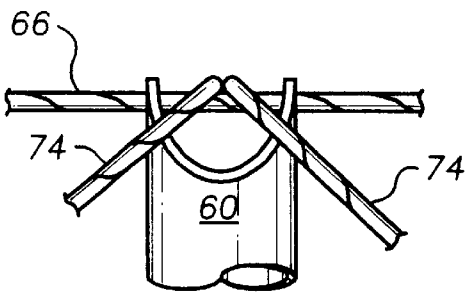
FIG. 12 is an enlarged a fragmentary elevational view of an intermediate ridge post enclosed by the arrows 12 of FIG. 1.

A plurality (3) of eave framing cables 64 extend horizontally between the end posts assemblies 22 at opposite eaves of the roof support structure canopy and between the valley end posts 26. A pair of roof ridge framing cables 66 extend between the roof ridge end post assemblies 24 at respective ends of the structure. As illustrated by FIGS. 6 and 12, the roof ridge cables 66 project through the post apertures 48 and a sleeve 49 interposed between the inverted V-shaped end portions of the ridge end posts 42 and the intermediate posts 60. A pair of roof framing cables 68 are clamped, at one end portion, to the plate 38 on the corner post assemblies 22 at respective ends of the structure and extend tautly over the sleeve 49 on the ridge line cable 66 between the inverted V-shape of the respective end post 42 and are respectively anchored to the plate 38 on the valley end post 26. Additionally, companion cables 68' extend from the top of the brace post 43, of the respective ridge end post assembly 24, to the valley end post assembly 26 and the respective adjacent corner post assembly 22 to minimize ridge post buckling.

Similarly a pair of intermediate framing cables 70 extend transversely of the structure between the respective eave post assembly 58, over intermediate ridge posts 60 between the V-shapes thereof and over the cable 66 and are similarly clamped in the apertures 40 of the plates 38 on the intermediate valley posts 62.

Figure 1A:
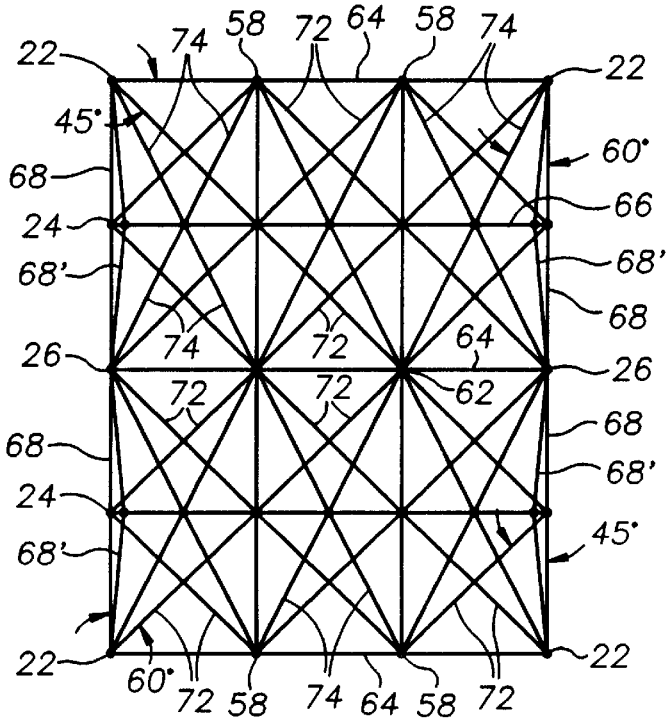
FIG. 1A is a plan view, to a smaller scale, of FIG. 1.

As best illustrated by FIG. 1A, other structural cables 72 and 74 extend diagonally from the eave post assemblies 22 and 58 across the structure in 45° and substantially 60° angular relationship with respect to the axes of the eave cables 64.

Figure 2:
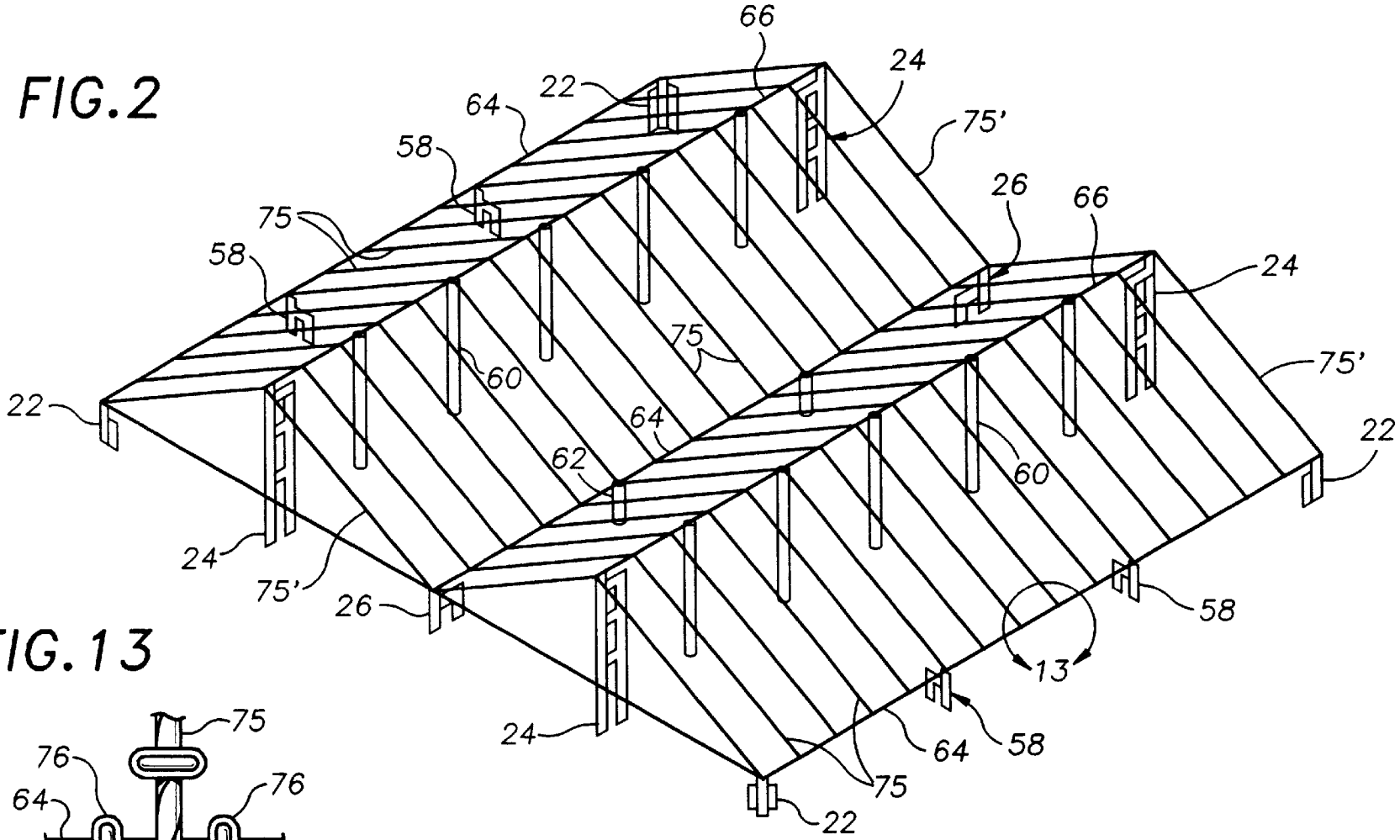
FIG. 2 is an isometric view similar to FIG. 1, illustrating fabric cover support cables, the framing and bracing cables being omitted for clarity.

Referring more particularly to FIG. 2, a plurality of roof fabric supporting cables 75 extend transversely across the structure from one eave cable 64 to the other in equally spaced parallel relation preferably equalling lateral dimensions of fabric strips forming a roof cover 85 (FIG. 3) as presently explained. The cables 75 are aligned with and connected with eave end and intermediate assembly posts apertured plates 38 in the manner explained hereinabove.

Figure 13:
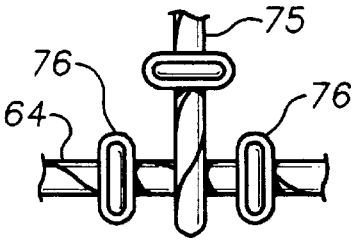
FIG. 13 is an enlarged fragmentary view of the area enclsed by the arrows 13 of FIG. 2.

The ends of the cables 75 between adjacent eave posts are loop clamped around the eave cable 64 between cable clamps 76 (FIG. 13) to prevent lateral movement of the cable 75 relative to the structure eave cable 64 or ridge cable 66. The fabric supporting end cable 75' passing over the ridge post assembly 24 overlies the fabric shield 78 on the inverted V-shapes of the posts 42.

Figure 7:
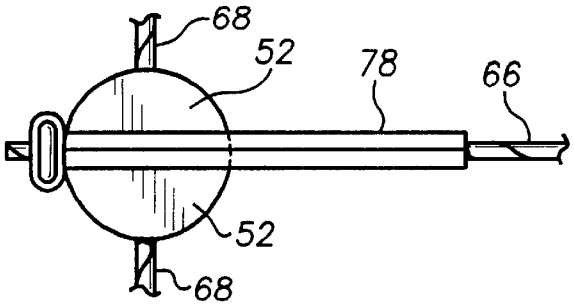
FIG. 7 is a framentary top view of FIG. 6.
Figure 9:
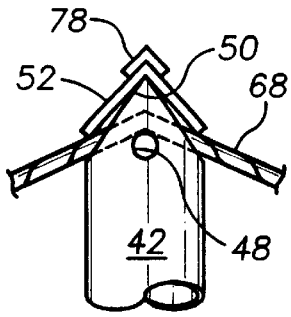
FIG. 9 is a left side elevational view of FIG. 6 with the cable clamp removed for clarity.

As illustrated by FIGS. 6 and 7, an elongated inverted V-shape fabric protecting shield 78 overlies the apex of the post V-shape and projects toward adjacent ridge posts in overlying relation on the adjacent portion of the ridge cable 66 for shielding the roof fabric as believed presently apparent. Additionally, a cable fabric restraining cable 80 extends horizontally between eave end posts assemblies 22 and the valley end posts 26 at respective ends of the structure.

Figure 3:
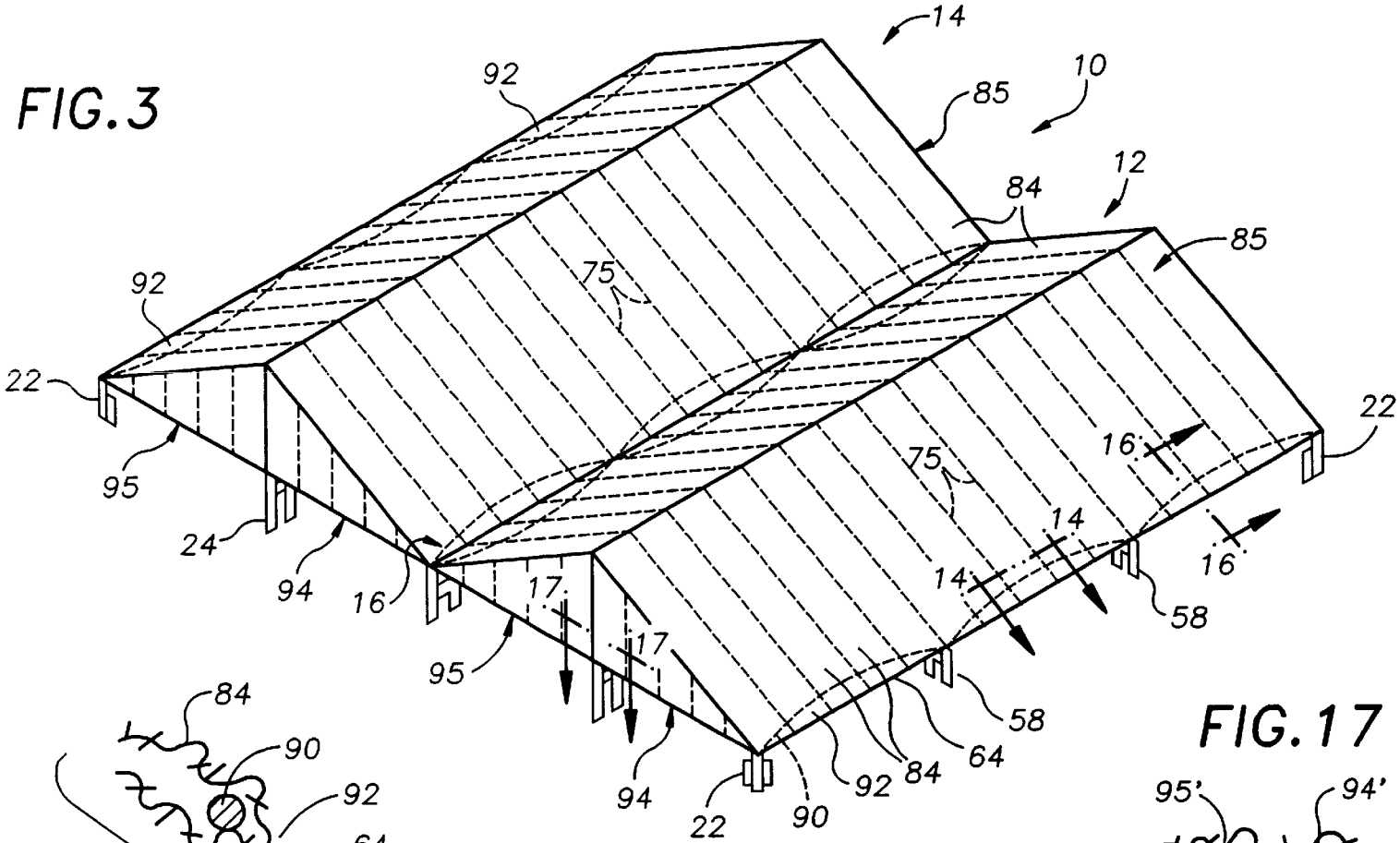
FIG. 3 is an isometric view similar to FIGS. 1 and 2 illustrating the complete structure.

Referring also to FIG. 3, a plurality of elongated strips 84 of fabric preferably polyethylene, which yields to the impact of a mass impressed thereon but does not easily rupture, are longitudinally stitched together in juxtaposed relation to form the structure or canopy roof cover 85 extending from one structure eave cable 64 over the ridge cable 66 to the valley forming eave cable.

Figure 14:
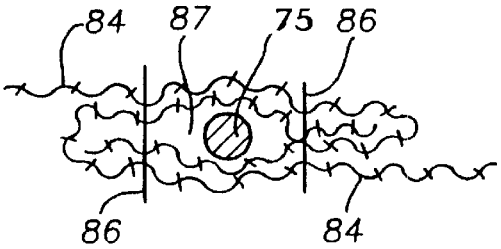
FIG. 14 is a horizontal cross section to an enlarged scale taken substantially along the line 14—14 of FIG. 3.
Figure 15:
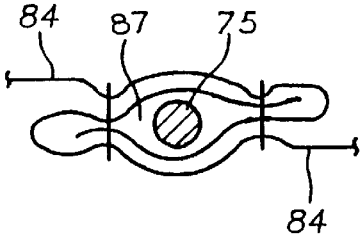
FIG. 15 is a line diagram of FIG. 14.

As illustrated by FIGS. 14 and 15, the adjacent longitudinal edges of the fabric strips 84 are joined together in overlapping relation by coextensive parallel rows of stitching 86 to form a loop 87 extending longitudinally of the fabric which receives the fabric supporting cables 75.

Figure 16:
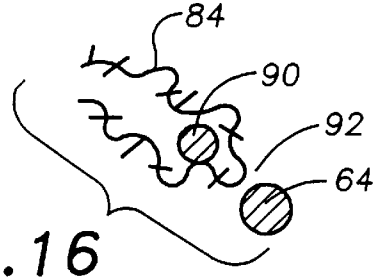

The end portions of the fabric strips 84 are similarly provided with a transverse loop which receives a fabric eave end supporting cable 90 extending between and connected with the end posts 22 and intermediate posts 58. This results in a gap or opening 92 (FIG. 16) at the valley position which allows snow accumulating on the sides of the roof fabric 85 to fall by gravity to the surface of the earth at the valley position rather than piling up on the roof fabric.

Figure 17:
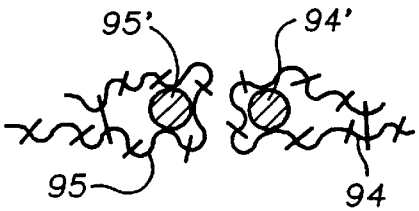
FIGS. 16 and 17 are cross section views to a different scale taken substantially along the lines 16—16 and 17—17, respectively, of FIG. 3.

Right triangular-shaped gable end fabric portions 94 and 95 have their cable reinforced hypotenuse edge portion, overlying the fabric support cable 75', extending from the ridge post top portions to one end post assembly 22. The altitude side of each fabric right triangular gable end portion 94 and 95 is similarly provided with a cable 94' and 95' independent of the altitude side of the adjacent right triangular gable end portion as illustrated by FIG. 17. This arrangement permits the gable end altitude edge portion of the respective triangular shape to billow outwardly or inwardly in response to wind force against the gable ends of the roof structure. The horizontal end cable 80 being similarly secured to the base portion of the triangular shaped fabric gable end panels 94 and 95.

Obviously the invention is susceptible to changes or alterations without defeating its practicability. Therefore, I do not wish to be confined to the preferred embodiment shown in the drawings and described herein.

I claim:

1. An automotive parking lot hip-and-valley roof-type hail protection structure, comprising:

a first plurality of upright post assemblies arranged in longitudinal and transverse rows for defining a rectangular boundary of a parking lot;

a second plurality of upright posts interposed in aligned spaced relation between said longitudinal and transverse rows, each post of said first and second plurality of posts having a portion of its depending end embedded in the surface of the earth;

a plurality of parallel longitudinal cables tautly extending between and connected with the upper limit of the posts in said longitudinal post rows for defining roof-type ridge and eave cables;

a plurality of transverse cables tautly extending between and connected with the upper limit of the posts in said transverse rows;

a plurality of other cables tautly extending between diagonally opposite posts and post assemblies;

a plurality of structure cover support cables tautly extending transversely of the structure between said eave cables in parallel spaced-apart relation between said transverse cables on the transverse rows of posts;

structure cover means including elongated juxtaposed fabric strips, transversely equal with the spacing between said structure cover support cables, secured together by parallel rows of stitching in longitudinal fabric edge overlapping relation juxtaposition to form a longitudinally coextensive fabric loop between each two adjacent strips surrounding the respective said cover support cable, and in overlying relation with respect to said ridge cables;

said fabric strips having aligned transverse end portion loops; and, a fabric eave cable in each said fabric strip end portion loop and connected with respective corner and eave post assemblies.

2. The automotive hail protection structure according to claim 1 in which each said post assembly includes:

a cable support tubular post;

a brace post interposed between said cable support post, adjacent the latter, and an adjacent post of the respective longitudinal and transverse row of posts;

brace means rigidly interposed between said cable support post and said brace post; and, cable fastening means on the upper end portion of said cable support posts.

3. The automotive hail protection structure according to claim 2 in which the cable fastening means comprises:

a plate overlying and projecting beyond the perimeter of said support post, said plate having a plurality of apertures in its marginal edge portion.

4. The automotive hail protection structure according to claim 3 in which:

the top end portion of the ridge cable support posts having an inverted V-shape with the apex of the V-shapes longitudinally aligned and having a transverse aperture for receiving intermediate portions of said roof ridge cable; and, inverted V-shaped panel means interposed between the V-shapes of the several ridge cable support posts and fabric cover means.

5. The automotive hail protection structure according to claim 4 in which the angle between the sides of the inverted V-shapes is not greater than 90°.

6. An automobile parking lot drive under hip-and-valley hail protection roof structure, comprising:

a plurality of upright post means arranged by rows in a rectangular grid pattern for forming boundary rows and at least one roof ridge post row interposed between roof eave post rows;

each post of said plurality of posts having a portion of a depending end embedded in the surface of the earth;

cable connecting means on an upper end portion of each post of said plurality of post means;

a first plurality of structure cables longitudinally extending between and respectively connected with said post means in the ridge post row and the eave post rows of the rectangular grid pattern;

a second plurality of structure cables diagonally extending between and connected respectively with diagonal rows of posts in the rectangular grid pattern;

roof means including elongated juxtaposed strips of material overlying said first and said second plurality of structure cables and secured at respective end portions to said eave cables in overlying relation with respect to said roof ridge post means and said first and said second plurality of structure cables; and, a roof material supporting cable secured at its respective ends with the respective eave structure cable and surrounded by the juncture of adjacent roof material strips.

7. The automotive hail protection structure according to claim 6 in which the roof means includes:

resilient fabric material having the edges of said juxtaposed strips doubled back upon themselves in interlocked relation with a respective adjacent fabric strip;

longitudinal rows of spaced-apart stitching securing the strips together and forming a coextensive fabric loop between adjacent rows of said stitching, said roof material retaining cable disposed in each said fabric loop.

8. The automotive hail protection structure according to claim 7 in which each said post means in said boundry rows includes:

a cable supporting post having a predetermined length; and, a shorter brace post rigidly secured in spaced parallel relation to the first named post.

9. The automotive hail protection structure according to claim 8 in which the cable connecting means includes:

a marginally apertured plate centrally overlying each post means in each post row of said grid pattern excluding said roof ridge post row, each said post in said roof ridge row having an inverted V-shaped upper end portion with the apexes of the V-shapes longitudinally aligned in the roof ridge row for supporting said structure cables extending between the roof eave post rows, the V-shapes being line drilled for receiving said roof ridge structure cable.

*10. An automotive vehicle drive under protective roof structure, comprising:*

*a plurality of upright posts arranged by rows in a rectangular grid pattern for forming boundary rows and at least one roof ridge post row interposed between eave post rows;*

*each post of said plurality of posts having a portion of a depending end embedded in the surface of the earth;*

*cable connecting means on an upper end portion of each post of said plurality of posts;*

*a plurality of structure cables longitudinally extending between and respectively connected with said posts in the ridge post row and the eave post rows of the rectangular grid pattern;*

*roof means including elongated juxtaposed strips of material overlying said structure cables and secured at respective end portions adjacent to the structure cables extending between the posts of said eave post rows, said strips being in overlying relation with respect to the structure cable extending between the posts in said ridge post row; and*

*a roof material supporting cable secured at its respective ends with the structure cable extending between the posts of said eave post rows and surrounded by the juncture of adjacent roof material strips.*

*11. An automotive vehicle drive under roof structure, comprising:*

*a plurality of upright posts arranged to form a generally rectangular pattern and including two pairs of corner posts defining substantially parallel eave post rows at opposite ends of the rectangular pattern, said posts further including ridge posts defining a ridge post row located between and generally parallel to the eave post rows;*

*each post having a portion embedded in the surface of the earth and each ridge post having a greater height than the corner posts;*

*a pair of eave cables extending tautly between said corner posts along the respective eave post rows at upper end portions of the posts;*

*a ridge cable extending tautly between upper end portions of said ridge posts;*

*a plurality of fabric support cables extending tautly between said eave cables and said ridge cable; and*

*a plurality of elongated juxtaposed strips of flexible fabric material extending along said fabric support cables and connected side to side to form a continuous roof structure extending between said eave post rows and over said ridge cable, said strips connected at opposite ends thereof adjacent to said eave cables and connected to adjacent strips at junctures surrounding said fabric support cables.*

*12. The roof structure according to claim 11, including a plurality of end supporting cables for each eave connected to extend generally along but separately from said eave cables, the opposite ends of said fabric strips being connected with said end supporting cables.*

*13. An automotive vehicle hip-and-valley protective roof structure, comprising:*

*a plurality of upright posts arranged in a generally rectangular grid pattern and including eave posts forming eave post rows at opposite ends of the rectangular grid pattern and valley posts forming at least one valley post row between the eave post rows, said posts including ridge posts forming ridge post rows between the valley post row and the respective eave post rows;*

*each post having a portion embedded in the earth and each ridge post having a greater height than the eave and valley posts;*

*a pair of eave cables extending tautly between the eave posts in the respective eave post rows;*

*a valley cable extending tautly between the valley posts;*

*a pair of ridge cables extending tautly between the ridge posts in the respective ridge post rows;*

*a plurality of fabric support cables extending tautly from each eave cable over the adjacent ridge cable to the valley cable; and*

*a plurality of elongated juxtaposed strips of flexible fabric material extending along and connected to said fabric support cables and having ends connected adjacent to said eave and valley cables, said strips cooperating to form a substantially continuous fabric cover over said rectangular grid pattern and being connected to adjacent strips at junctures surrounding said fabric support cables.*

*14. An automotive vehicle protective roof structure, comprising:*

*four corner post assemblies each including an upright primary corner post anchored to the ground and a pair of upright brace posts embedded in the ground;*

*a substantially horizontal connection arm extending between each brace post and said primary corner post and another substantially horizontal connection arm extending between said brace posts, said arms being adjacent to upper end portions of said brace posts;*

*a plurality of additional posts anchored to the ground and arranged to form a rectangular grid pattern with said corner post assemblies;*

*a plurality of cables extending tautly between said posts; and*

*a fabric roof supported by and connected to said cables, said roof including elongated juxtaposed strips of flexible fabric material each connected to an adjacent strip at a juncture surrounding one of said cables.*

*15. The roof structure according to claim 14, wherein said additional posts include perimeter post assemblies arranged along the perimeter of said grid structure and each including:*

*an upright primary perimeter post anchored to the ground;*

*an upright perimeter brace post anchored to the ground; and*

*a substantially horizontal connection arm extending between said primary perimeter post and said perimeter brace post.*

* * * * *